US008535149B2

(12) United States Patent
Ziegler et al.

(10) Patent No.: US 8,535,149 B2
(45) Date of Patent: Sep. 17, 2013

(54) TRACKING CAREER PROGRESSION BASED ON USER ACTIVITIES

(75) Inventors: Bonnie Ross Ziegler, Seattle, WA (US); Francis O'Connor, Seattle, WA (US); Kiki Wolfkill, Seattle, WA (US); Rich Wickham, Seattle, WA (US); Thomas Zucotti, Vancouver (CA); James Veevaert, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 12/820,975

(22) Filed: Jun. 22, 2010

(65) Prior Publication Data

US 2011/0312398 A1 Dec. 22, 2011

(51) Int. Cl.
*A63F 9/24* (2006.01)

(52) U.S. Cl.
USPC .................................. 463/29; 463/16

(58) Field of Classification Search
USPC ......................... 463/40–43, 16, 29
See application file for complete search history.

(56) References Cited

U.S. PATENT DOCUMENTS

| | | | |
|---|---|---|---|
| 8,210,927 | B2 | 7/2012 | Hedrick et al. |
| 2006/0122716 | A1* | 6/2006 | Bortnik et al. ............... 700/91 |
| 2006/0128460 | A1* | 6/2006 | Muir et al. .................. 463/16 |
| 2007/0117623 | A1* | 5/2007 | Nelson et al. ................ 463/29 |
| 2007/0173321 | A1* | 7/2007 | Shen et al. .................. 463/40 |
| 2008/0113789 | A1* | 5/2008 | Canessa et al. ............. 463/29 |
| 2008/0242421 | A1* | 10/2008 | Geisner et al. .............. 463/42 |
| 2009/0156310 | A1* | 6/2009 | Fargo ......................... 463/42 |
| 2009/0264202 | A1* | 10/2009 | Chen et al. .................. 463/42 |
| 2010/0069148 | A1* | 3/2010 | Cargill ....................... 463/25 |
| 2011/0201415 | A1* | 8/2011 | Gagner et al. .............. 463/25 |
| 2012/0028718 | A1* | 2/2012 | Barclay et al. .............. 463/42 |

FOREIGN PATENT DOCUMENTS

| | | |
|---|---|---|
| CN | 1301188 | 6/2001 |
| CN | 101005883 | 7/2007 |
| CN | 101156182 | 4/2008 |
| EP | 1782867 A1 | 5/2007 |
| WO | 9947216 | 9/1999 |
| WO | 2010048231 | 4/2010 |

OTHER PUBLICATIONS

Tinasam, "XBOX 360's Bioshock Achievement Guide (Part One)," [http://www.brighthub.com/video-games/console/articles/10678.aspx], Oct. 10, 2008, 3 pages.
John, Tracey, "Blizzard Plans to Track Gamer Achievements Across 'WoW,' 'Starcraft' and 'Diablo'," [http://multiplayerblog.mtv.com/2008/08/01/blizzard-accounts-achievements/]. Aug. 1, 2008, 3 pages.
Loc, "Microsoft sets new guideline for gamerscore and achievements," Neowin.net, [http://www.neowin.net/news/microsoft-sets-new-guideline-for-gamerscore-and-achievements], Feb. 2, 2007, 4 pages.
McElroy, Griffin, "Windows Phone 7 Achievements to feature up to 200 Gamerscore points per game," [http://www.joystiq.com/2010/03/10/windows-phone-7-achievements-to-feature-up-to-200-gamerscore/], Mar. 10, 2010, 21 pages.
Orland, Kyle, "Microsoft to reward Xbox Live achievers with freebies," [http://www.joystiq.com/2007/02/06/microsoft-to-reward-xbox-live-achievers-with-freebies/], Feb. 6, 2007, 22 pages.
Genocide, "Halo Waypoint Hits XBL Preview," [http://www.eserved.net/?q=content/halo-waypoint-hits-xbl-preview], Oct. 31, 2009, 3 pages.
Eggleston, "How to earn achievements on HALO Wars," eHow.com, [http://www.ehow.com_5274315_earn-achievements-halo-wars.html], Retrieved Mar. 18, 2010, 3 pages.
First Office Action dated Jul. 1, 2013 in Chinese Patent Application No. 201110185047.6, 10 pages.
English Abstract of CN1301188, published Jun. 27, 2001.
English Abstract of CN101005883, published Jul. 25, 2007.
English Abstract of CN101156182, published Apr. 2, 2008.

\* cited by examiner

*Primary Examiner* — Masud Ahmed
(74) *Attorney, Agent, or Firm* — Vierra Magen Marcus LLP

(57) ABSTRACT

A method for generating career progression information for a user participating in one or more activities in a processing device is disclosed. User progress in the activities is tracked. The activities include game activities and non-game activities. Achievement scores for the user based on the game activities and the non-game activities are determined The achievement scores are aggregated across the game activities and the non-game activities to generate an aggregated career score for the user. Career progression information is generated for the user, based on the aggregated career score.

19 Claims, 11 Drawing Sheets

TRACKING CAREER PROGRESSION BASED ON USER ACTIVITIES

BACKGROUND

The console and personal computer-based video game experience has evolved from one in which an isolated gaming experience was provided into one in which users on a variety of processing devices such as personal computers and mobile devices can interact with each other to share a common game experience. One example of a system that enables users to communicate with each other is Microsoft's Xbox 360 Live® online game service. Using such systems, users are provided with a rich interactive experience which may be shared in real time between friends and other gamers. For example, users can track their own and their friends' progress via different applications maintained by the online game service through the concept of game scores and achievements.

SUMMARY

Technology is disclosed by which a user's progress and accomplishments across one or more activities may be tracked, based on a user's participation in one or more activities on a variety of processing devices. The processing devices may include, for example, a gaming and media console, a mobile device, such as, for example, a cell phone, a web-enabled smart phone, a personal digital assistant, a palmtop computer or a laptop computer, a personal computer and the like. The activities may include game related activities such as, for example, single player games or multiplayer games executing in the user's processing device or non-game related activities such as online transaction activities, or other group interaction activities that a user may wish to participate in. Information about a user's accomplishments across all game activities and non-game activities is utilized to generate career progression information for the user. The career progression information is displayed via a user interface in the user's processing device to the user.

In one embodiment, a method for generating career progression information for a user participating in one or more activities in a processing device is provided. The user's progress in one or more of the activities is tracked. The activities include game activities and non-game activities. Achievement scores for the user based on the game activities and the non-game activities are determined. The achievement scores are aggregated across the game activities and the non-game activities to generate an aggregated career score for the user. Career progression information is generated for the user, based on the aggregated career score.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Disclosed herein is a method and system by which career progression information for a user participating in a variety of activities in a processing device is generated. The career progression information includes information about a user's accomplishments across all game activities and non-game activities that the user participates in. In one embodiment of the disclosed technology, a user on a processing device may invoke a career progression service executing in a multiplayer gaming service to participate in one or more activities, via a user interface in the user's processing device. The career progression service may generate career progression information for the user based on the user's participation in a variety of activities. The career progression information may include achievement scores related to game and non-game activities related to the user, an aggregation of the achievement scores across all game activities and non-game activities that the user participates in and career milestones and career awards assigned to the user. In another embodiment of the disclosed technology, the career progression information may be displayed to the user via a user interface in the user's processing device.

Figure 1:
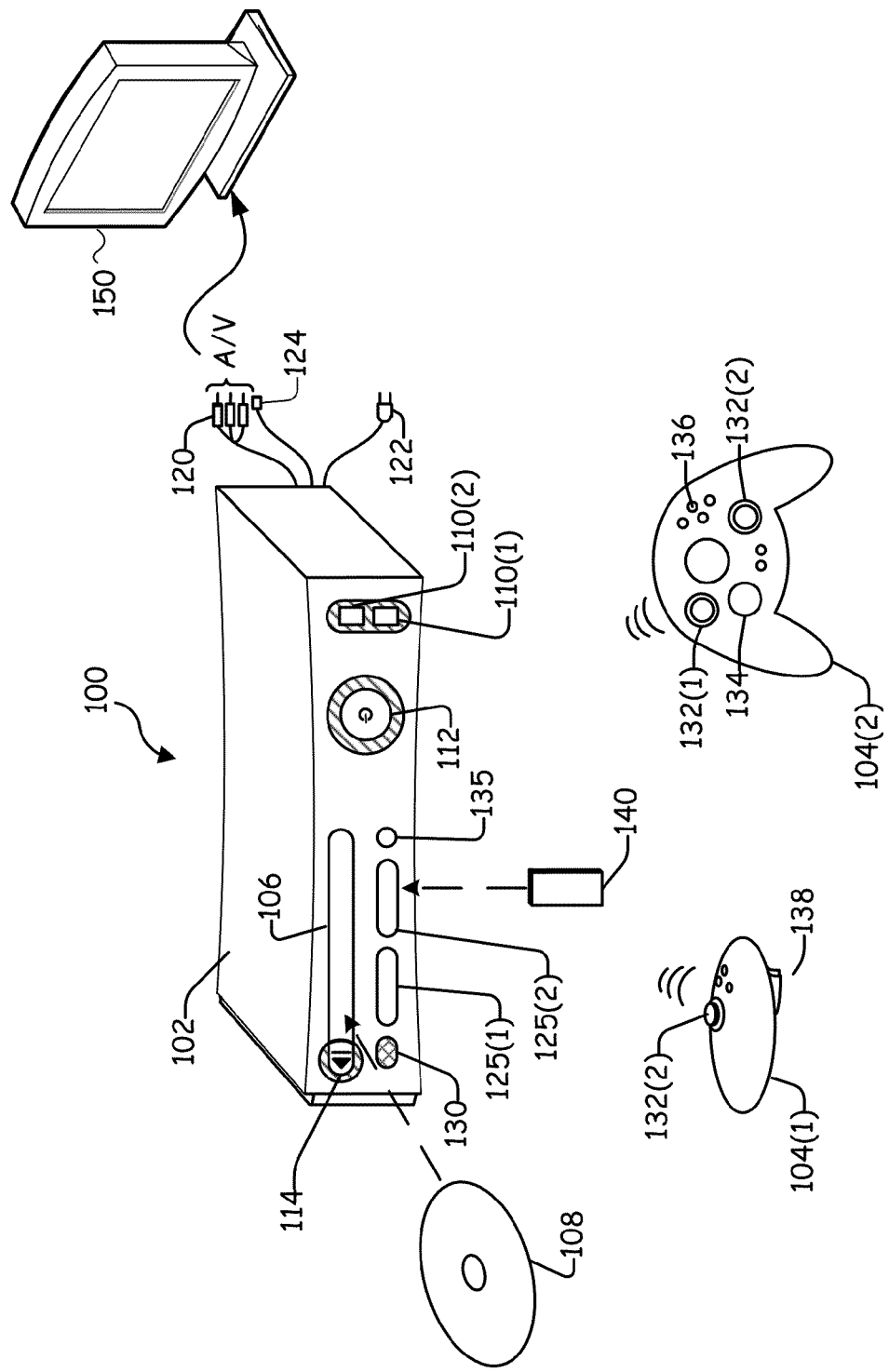
FIG. 1 is an isometric view of an exemplary gaming and media system.

FIG. 1 shows a gaming and media system as an exemplary processing device for implementing the operations of the disclosed technology. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140.

During operation, console 102 is configured to receive input from controllers 104 and display information on display 150. For example, console 102 can display a user interface on display 150 to allow a user to participate in a multiplayer game using controller 104.

Figure 2:
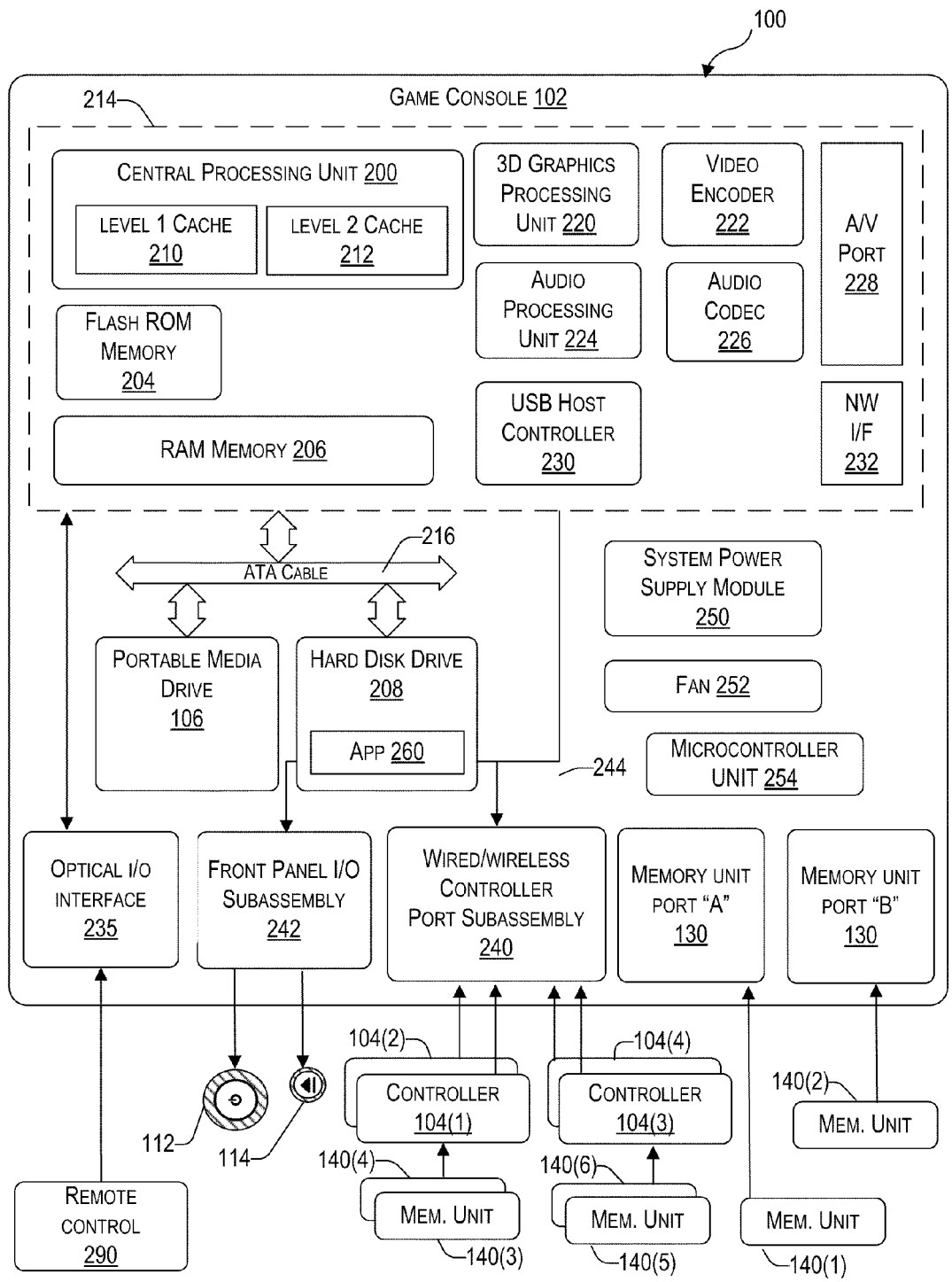
FIG. 2 is an exemplary functional block diagram of components of the gaming and media system shown in FIG. 1.

FIG. 2 is a functional block diagram of the gaming and media system 100 and shows functional components of the gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an AN (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed in connection with FIG. 5.

Figure 3:
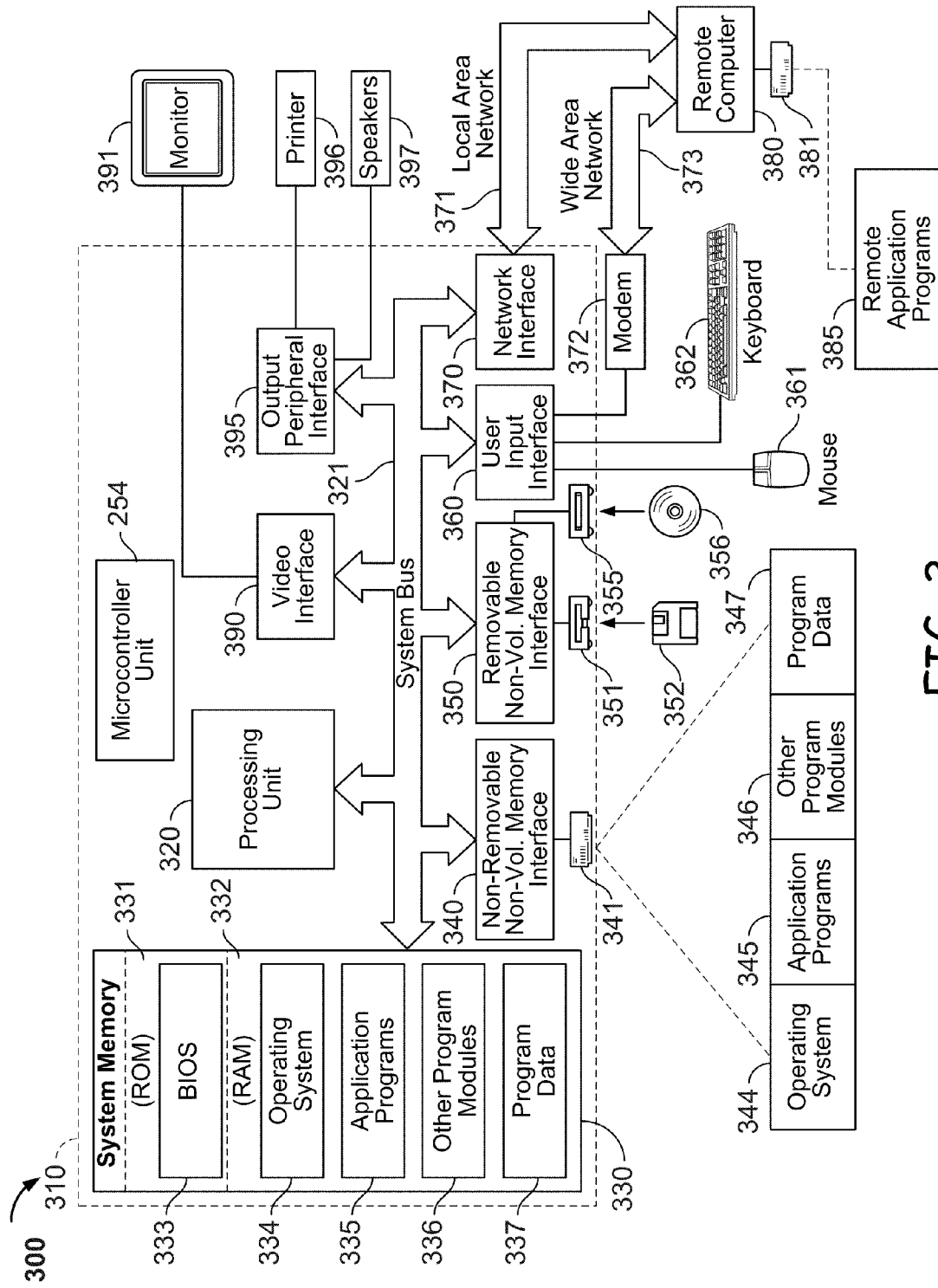
FIG. 3 illustrates another example embodiment of the gaming and media system shown in FIGS. 1-2.

FIG. 3 illustrates a general purpose computing device for implementing the operations of the disclosed technology. With reference to FIG. 3, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4:
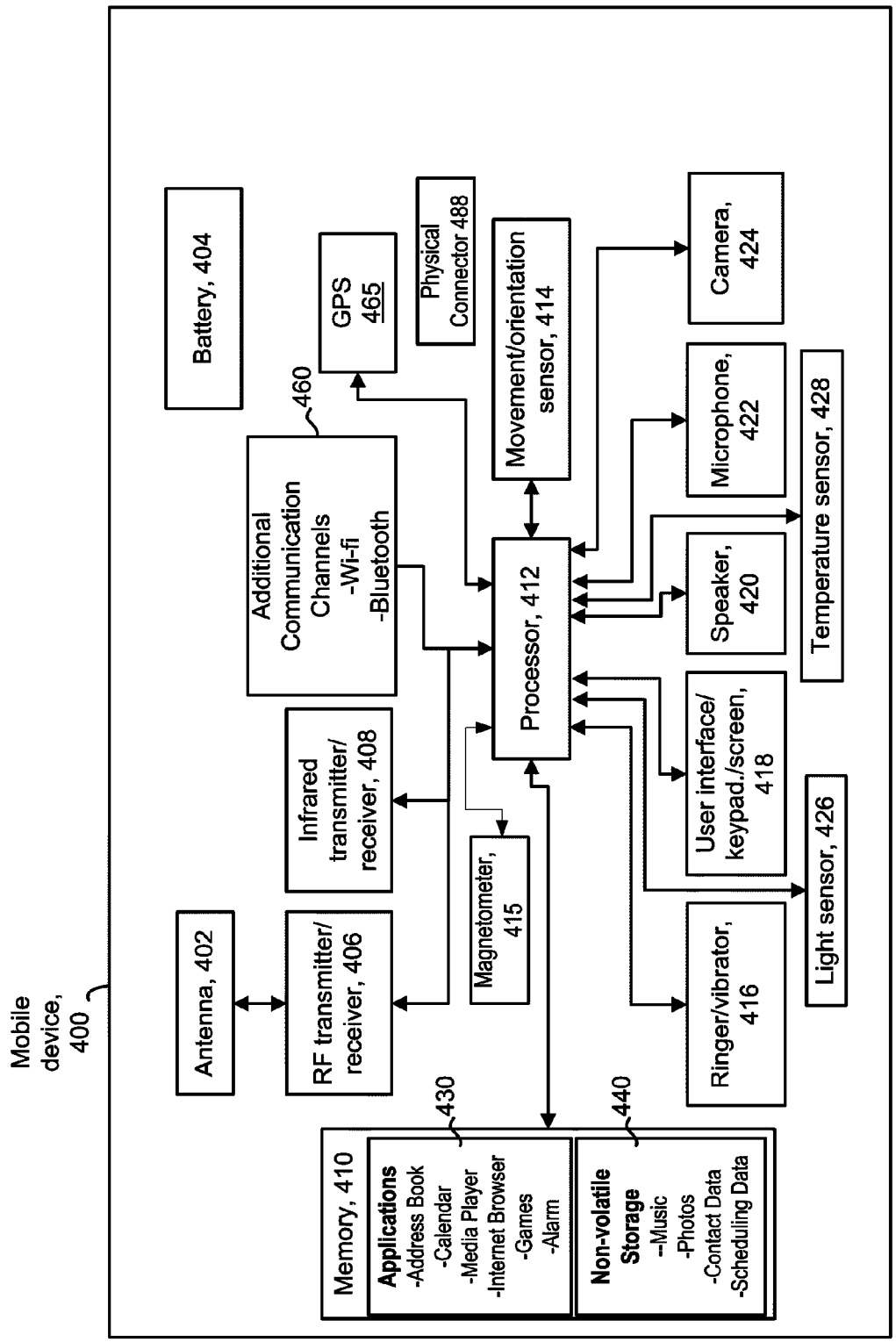
FIG. 4 is a block diagram of a mobile device for implementing operations of the disclosed technology.

FIG. 4 depicts an example block diagram of a mobile device for implementing the operations of the disclosed technology. Exemplary electronic circuitry of a typical mobile phone is depicted. The mobile device 400 includes one or more microprocessors 412, and memory 410 (e.g., non-volatile memory such as ROM and volatile memory such as RAM) which stores processor-readable code which is executed by one or more processors of the control processor 412 to implement the functionality described herein.

Mobile device 400 may include, for example, processors 412, memory 410 including applications and non-volatile storage. The processor 412 can implement communications, as well any number of applications, including the applications discussed herein. Memory 410 can be any variety of memory storage media types, including non-volatile and volatile memory. A device operating system handles the different operations of the mobile device 400 and may contain user interfaces for operations, such as placing and receiving phone calls, text messaging, checking voicemail, and the like. The applications 430 can be any assortment of programs, such as a camera application for photos and/or videos, an address book, a calendar application, a media player, an internet browser, games, an alarm application or other third party applications. The non-volatile storage component 440 in memory 410 contains data such as web caches, music, photos, contact data, scheduling data, and other files.

The processor 412 also communicates with RF transmit/receive circuitry 406 which in turn is coupled to an antenna 402, with an infrared transmitted/receiver 408, and with a movement/orientation sensor 414 such as an accelerometer and a magnetometer 415. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 412 further communicates with a ringer/vibrator 416, a user interface keypad/screen 418, a speaker 420, a microphone 422, a camera 424, a light sensor 426 and a temperature sensor 428. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 412 controls transmission and reception of wireless signals. During a transmission mode, the processor 412 provides a voice signal from microphone 422, or other data signal, to the transmit/receive circuitry 406. The transmit/receive circuitry 406 transmits the signal to a remote station (e.g., a fixed station, operator, other cellular phones, etc.) for communication through the antenna 402. The ringer/vibrator 416 is used to signal an incoming call, text message, calendar reminder, alarm clock reminder, or other notification to the user. During a receiving mode, the transmit/receive circuitry 406 receives a voice or other data signal from a remote station through the antenna 402. A received voice signal is provided to the speaker 420 while other received data signals are also processed appropriately.

Additionally, a physical connector 488 can be used to connect the mobile device 100 to an external power source, such as an AC adapter or powered docking station. The physical connector 488 can also be used as a data connection to a computing device. The data connection allows for operations such as synchronizing mobile device data with the computing data on another device. A global positioning service (GPS) receiver 465 utilizing satellite-based radio navigation to relay the position of the user applications is enabled for such service.

Figure 5:
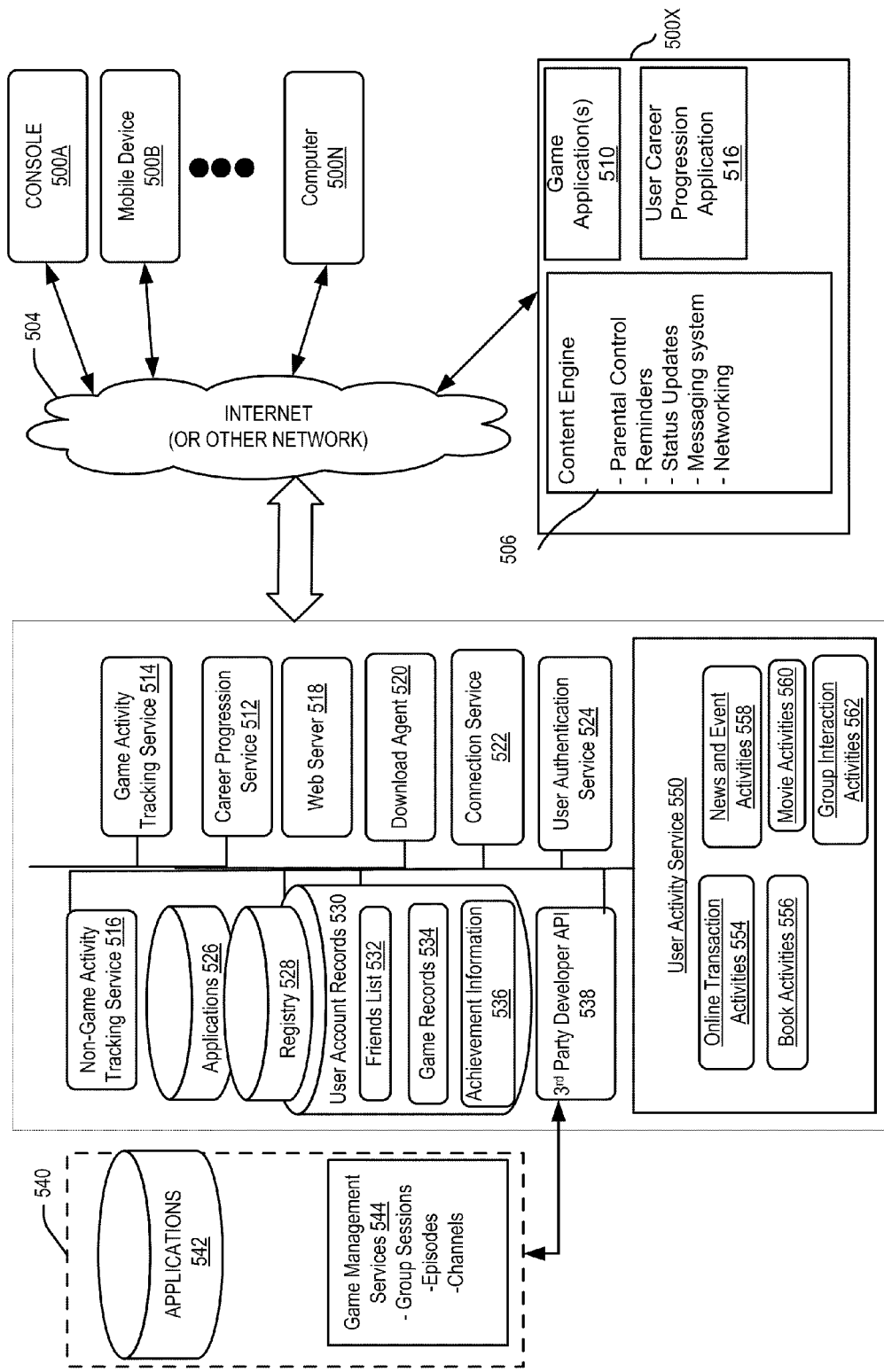
FIG. 5 illustrates an embodiment of a system for implementing the present technology.

FIG. 5 illustrates an embodiment of a system for implementing the present technology. FIG. 5 illustrates a multiplayer gaming service 502 which is coupled via a network 504 to one or more processing devices 500A, 500B, 500N, 500X. Network 504 may be a public network, a private network, or a combination of public and private networks such as the Internet. Each of the processing devices may comprise one or more of the processing devices illustrated in FIGS. 1 through 4 herein. These include a console 500A, a mobile device 500B, computer SOON, or a console 500X.

Multiplayer gaming service 502 includes one or more applications 526, which may include one or more game applications and user account records 530. Multiplayer gaming service 502 may also include a third party application programming interface 538 which allows third party application developers 540 to provide their own applications 542, which may include one or more game applications in conjunction with the multiplayer gaming service 502. Various components of the applications may be run on the multiplayer gaming service 502 and/or the consoles or processing devices. In one embodiment, third party gaming developers 540 having applications 542 may register the applications with the multiplayer gaming service 502 via a registry 528. In alternative embodiments, multiplayer games may be administered and provided directly by third party developers 540, but utilize services of the multiplayer gaming service 502, such as the download agent 520 and the connection service 522 to allow users having access to consoles to connect to each other. Third party developers 540 may provide one or more applications 542 and game management services at 544. Game management services 544 can provide updates on user sessions, including where game play lobbies and rooms of users gather for multiplayer game connections, various episodes, and games including episodic content, various gaming channels, (rooms for basic, intermediate, and advanced players), and the like. User account records 530 may include the user's friend list 532, individual game records 534 and a record of the user's career progression information 536. In one embodiment, and as will be discussed below, the user's career progression information may include game and non-game achievement scores, aggregated career score information, career milestone information and career award information for users participating in one or more activities in the processing devices 500A-X.

In one embodiment, users on processing devices 500A-X may invoke a career progression service 512 in the multiplayer gaming service 502 to participate in one or more activities in the processing devices 500A-X. In one embodiment, users on processing devices 500A-X may invoke the career progression service 512 via a user interface in the user's processing device. FIGS. 7-10 illustrate various user interface screens that enable a user to perform one or more operations of the disclosed technology. In one embodiment, one such service for enabling users to participate in a variety of activities, access game related content, movie trailers, video footage, multimedia content and the like may be provided by the Halo Waypoint™ application developed for Microsoft's Xbox 360® video game system.

In one embodiment, a user interface may be provided to the user via a career progression application 516 in the user's processing device. The career progression application 516 may be provided to processing devices 500A-X utilizing the download agent 520. This allows the career progression application 516 to be stored and run on the individual processing devices, or the career progression application 516 may be provided to users on processing devices 500A-X directly through the web server 518.

In accordance with the disclosed technology, the career progression service 512 may interact with a game activity tracking service 514, a non-game activity tracking service 516, and a user activity service 550 to generate career progression information for a user participating in one or more activities in processing devices 500A-X. In one embodiment, career progression information may include information about a user's accomplishments across all game activities and non-game activities that the user participates in. The career progression information may be stored in user accounts records 530. In one embodiment, the career progression service 512, the game activity tracking service 514, the non-game activity tracking service 516 and the user activity service 550 may be implemented as software modules to perform the operations of the disclosed technology.

The user activity service 550 provides users on processing devices 500A-X with one or more activities, which may include game activities and non-game activities. Game activities may include, for example, one or more game applications 526 executing in the multiplayer gaming service 502 that may be provided to users on processing devices 500A-X by the user activity service 550. Alternatively, game activities may be provided to users on processing devices 500A-X via one or more game applications 510 stored locally on the user's processing device or directly through the web server 518. Non-game activities may include, but are not limited to, online transaction activities 554, book activities 556, news and event activities 558, movie activities 560 and group interaction activities 562 that may be provided to users on processing devices 500A-X by the user activity service 550. Online transaction activities 554 may include, for example, transactions of game or non-game related content, transactions of products or merchandise such as game apparel or game accessories, or transactions of books or movies by users, book activities 556 may include book reviews provided by users, news and event activities 558 may include, for example, previews of web episodes, game play videos and gameplay related strategies provided by users, movie activities 560 may include trailers and videos and group interaction activities 562 may include, for example, chat sessions between users.

The game activity tracking service 514 in the multiplayer gaming service 502 tracks a user's progress in a game activity in the user's processing device and determines an achievement score related to the game activity for the user. The non-game activity tracking service 516 in the multiplayer gaming service 502 tracks a user's progress in a non-game activity in the user's processing device and determines an achievement score related to the non-game activity for the user. The career progression service 512 may then generate career progression information for a user based on the achievement scores received from the game activity tracking service 514 and the non-game activity tracking service 516. The technique of determining achievement scores and generating career progression information is discussed in FIG. 6B.

Multiplayer gaming service 502 may also include a user authentication service 524, wherein each user on one or more of the processing devices 500A, 500B, 5OON, 500X has associated therewith a unique user identifier, such as a gamer tag, which is used to uniquely identify the user within the multiplayer gaming service 502. When a user seeks to play or interact with one of the applications 526 or 510 with other users on other processing devices, connection by and/or between the users is controlled by first requiring each of the users to authenticate themselves to the multiplayer gaming service 502 via the user authentication service 524. The connection service 522 allows different users on different processing devices to participate in activities resident on those devices with other users, and maintains connections between the users. An exemplary connection service is Microsoft's X-Box Live™ service provided by Microsoft Corporation, Redmond, Wash.

Console 500X illustrates functional components of applications and activities which may be occurring on any one or more of the devices 500A, 500B, 500N, 500X. Console 500X may include a number of game applications 510 executed by the processing device of the console 500X. In one embodiment, console 500X may also include a career progression application 516, as discussed above. Each device 500X may include a content engine 506 which executes one or more functions to enable gameplay and/or application usage on the processing device 500X. The content engine can include, for example, parental controls, reminders, status updates, an internal messaging system, and networking capabilities to enable the devices to couple to the internet or other network 504.

Figure 6A:
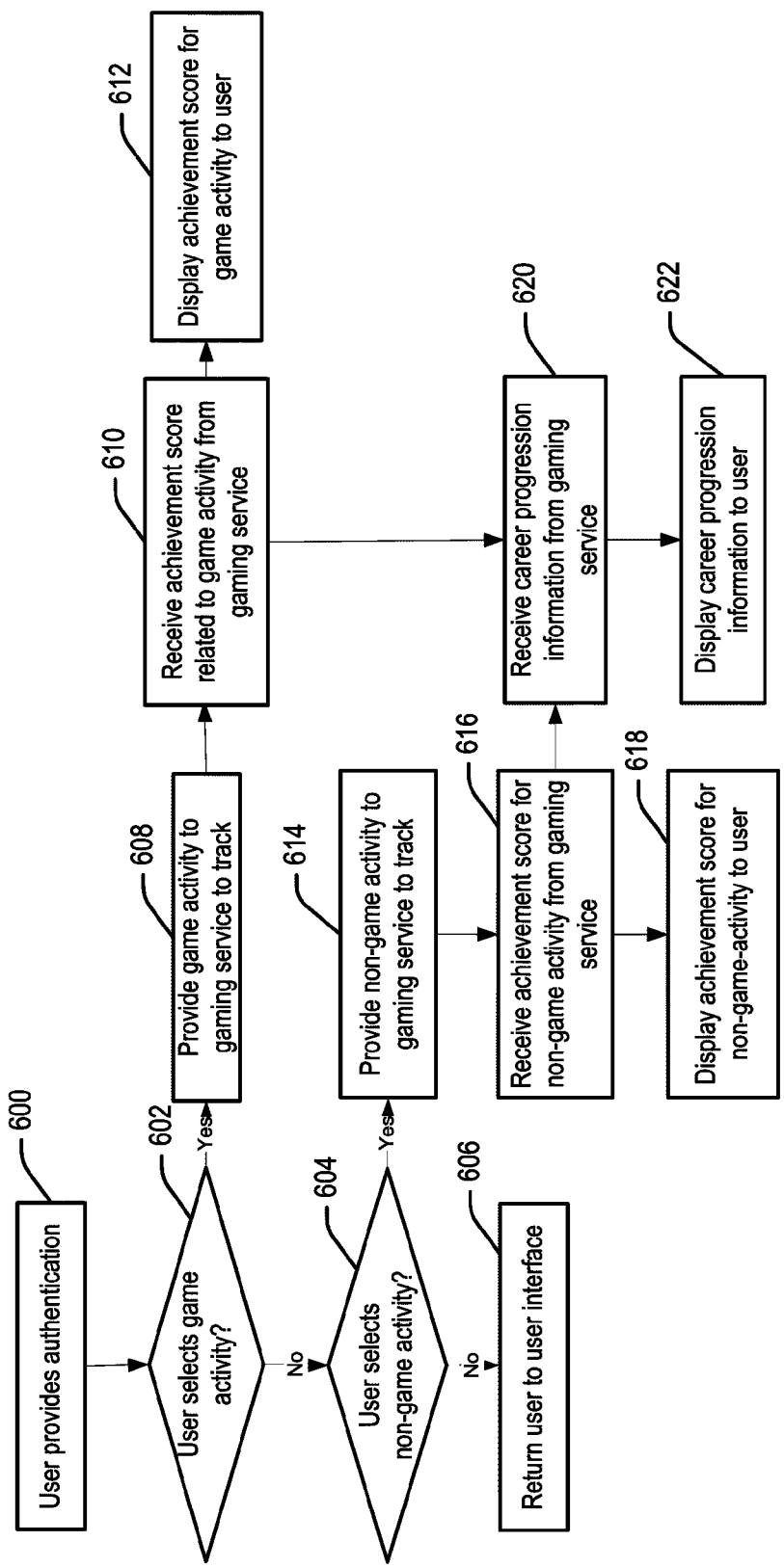
FIG. 6A illustrates an exemplary set of operations performed on a processing device in accordance with the disclosed technology.

FIG. 6A illustrates an exemplary set of operations performed on a processing device in accordance with the disclosed technology. In one embodiment, the steps of FIG. 6A may be performed on a user's processing device such as, for example, 500X shown in FIG. 5. In step 600, a user provides authentication on a processing device, such as, for example, 500X shown in FIG. 5. Authentication may be performed locally on the processing device or by transmitting user authentication credentials to the multiplayer network service 502. Once the user is authenticated, at step 602, a check is made to determine if the user has selected to participate in a game activity. As discussed above, a game activity may include one or more game applications 526 that may be provided to users on processing devices 500A-X, via the user activity service 550. Alternatively, game activities may be provided to users on processing devices 500A-X via one or more game applications 510 stored locally on the user's processing device or directly through the web server 518.

Figure 7:
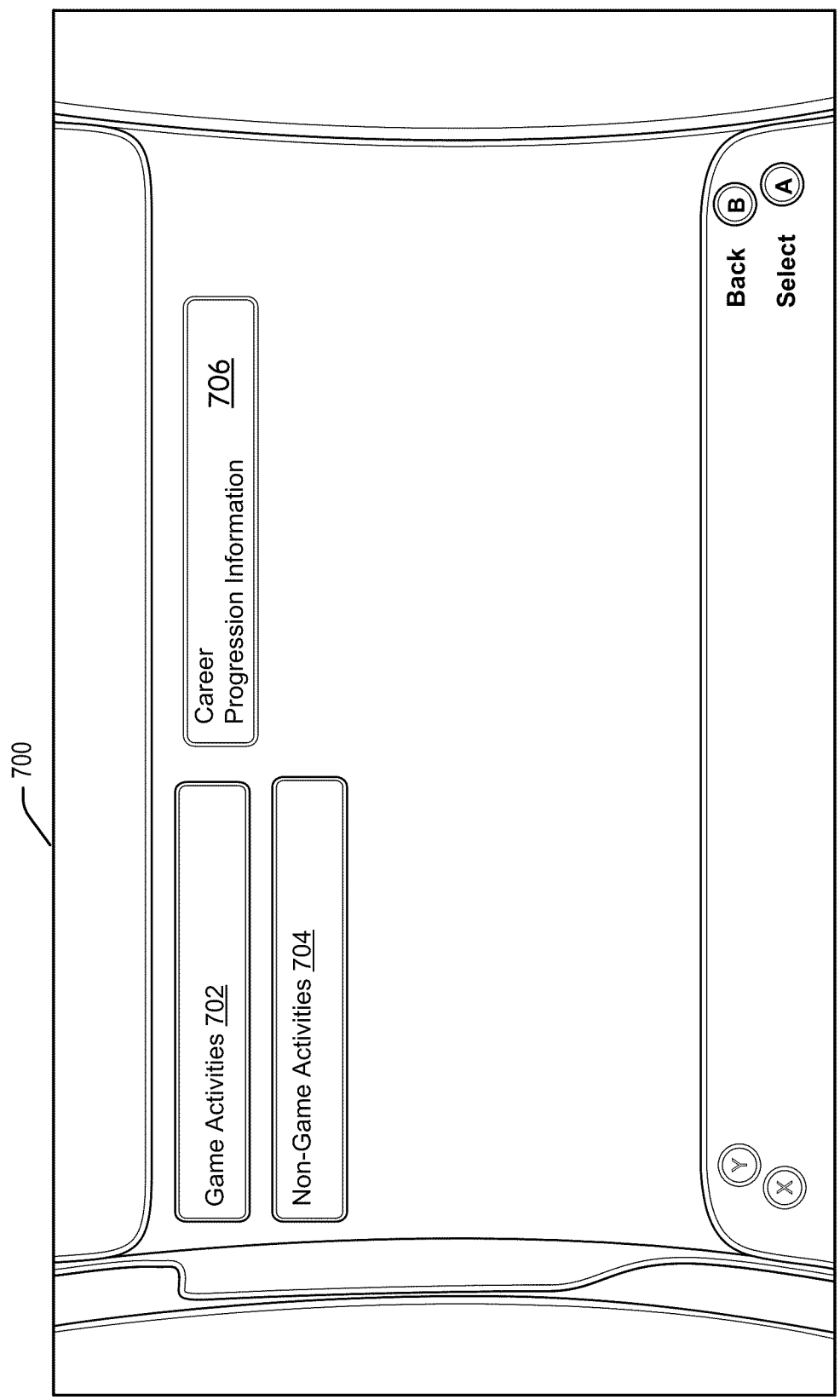
FIG. 7 illustrates an exemplary user interface screen for enabling a user to perform one or more operations of the disclosed technology.
Figure 8:
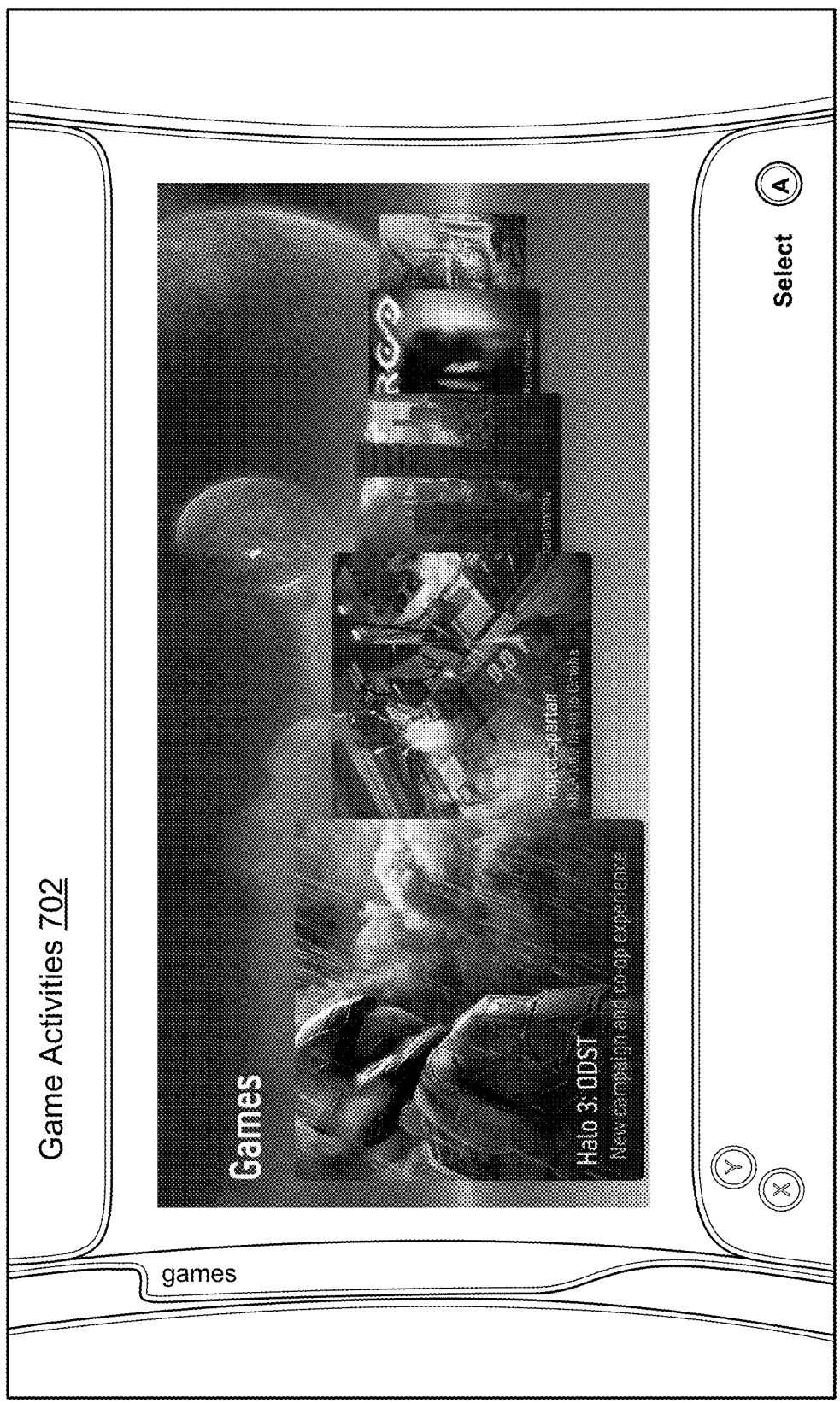
FIG. 8 is a user interface screen that displays exemplary game activities for a user.
Figure 10:
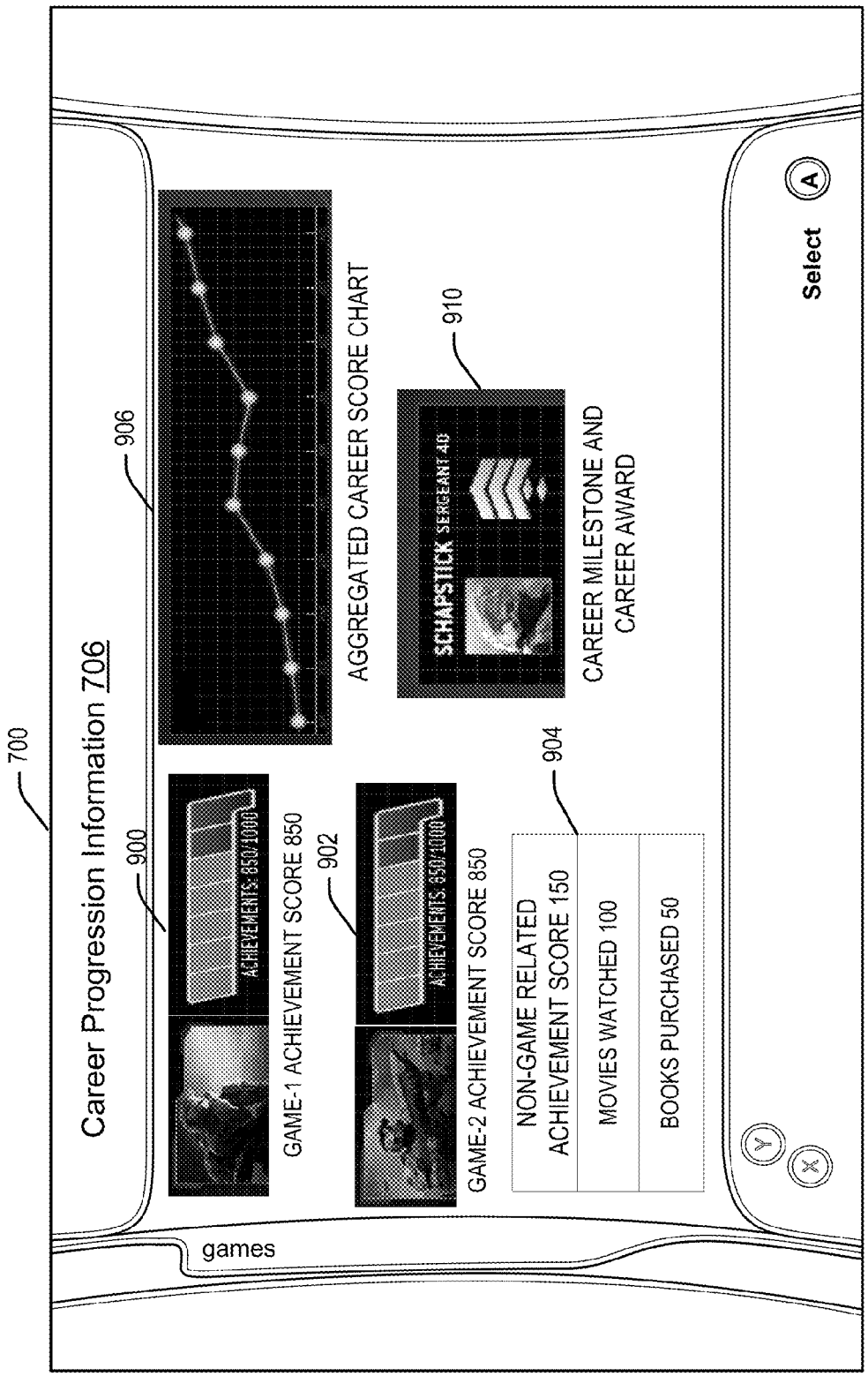
FIG. 10 is a user interface screen that displays career progression information related to a user.

At step 602, a user may be prompted by a user interface in the user's processing device to select a game activity. FIG. 7 illustrates an exemplary user interface screen that enables a user to select a game activity. In one embodiment, the user interface screen may be provided to the user, via the career progression application 516 in the user's processing device. If the user selects to participate in a game activity at step 602, the game activity is provided to the multiplayer gaming service 502 to track in step 608. FIG. 8 illustrates an exemplary user interface screen that displays one or more game activities for users on processing devices 500A-X. Specifically, the game activity tracking service 514 in the multiplayer gaming service 502 may track a user's progress in the game activity and determine an achievement score related to the game activity for the user. At step 610, a user receives an achievement score related to the game activity from the multiplayer gaming service 502. At step 612, the achievement score is displayed to the user on the user's processing device. FIG. 10 illustrates an exemplary user interface screen that displays an achievement score related to a game activity for a user. The technique of determining an achievement score for a game activity is discussed in FIG. 6B.

Figure 9:
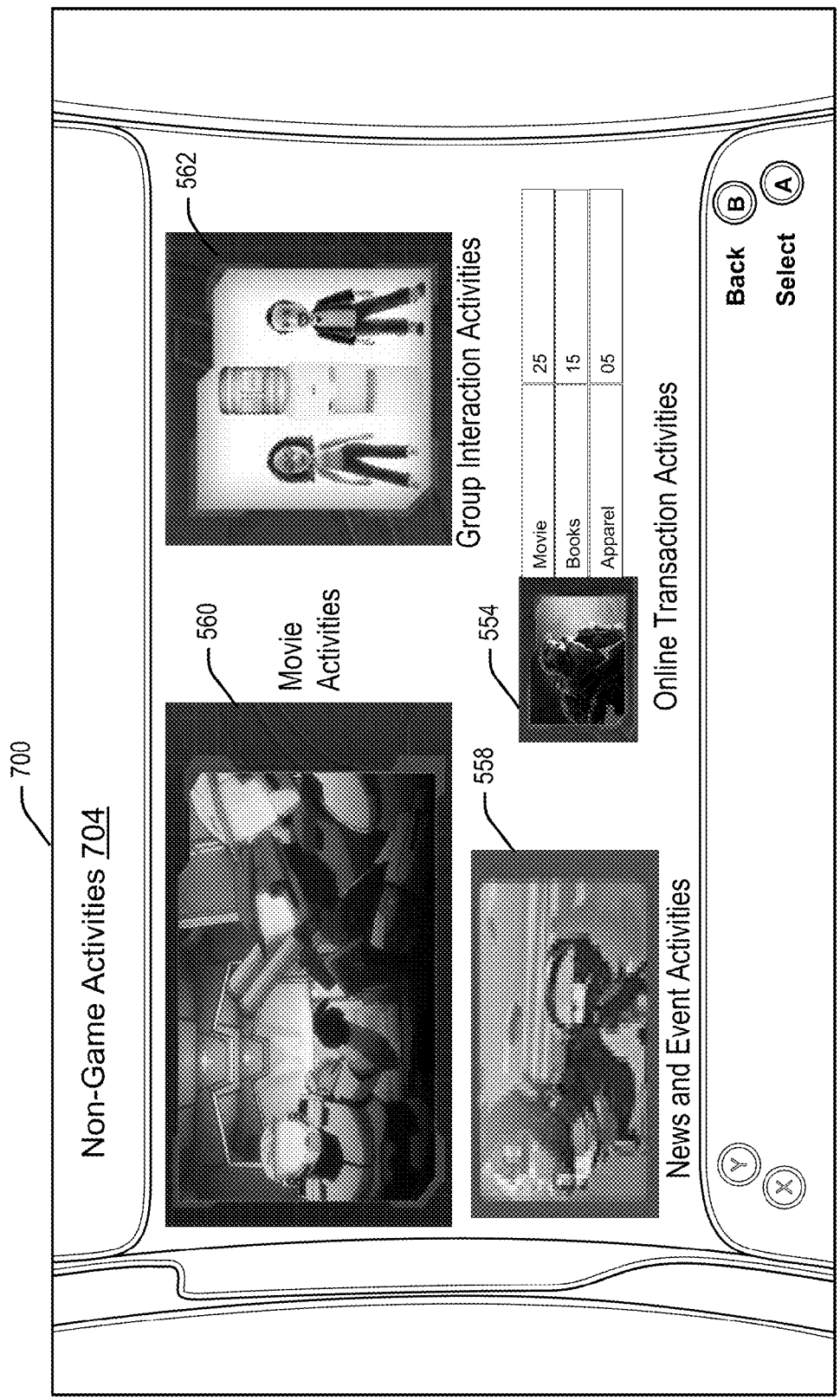
FIG. 9 is user interface screen that displays exemplary non-game activities for a user.

If at step 602, the user does not select to participate in a game activity, then at step 604, a check is made as to whether the user has selected to participate in a non-game activity. As discussed above, a non-game activity may include, for example, online transaction activities 554, book activities 556, news and event activities 558, movie activities 560 and group interaction activities 562 that may be provided to users on processing devices 500A-X by the user activity service 550 in the multiplayer gaming service 502. FIG. 9 illustrates an exemplary user interface screen that displays one or more non-game activities for users on processing devices 500A-X. At step 604, a user may be prompted by a user interface in the user's processing device to select a non-game activity. FIG. 7 illustrates an exemplary user interface screen that enables a user to select a non-game activity. If the user selects to participate in a non-game activity at step 604, the non-game activity is provided to the multiplayer gaming service 502 to track at step 614. At step 616, a user receives an achievement score related to the non-game activity from the multiplayer gaming service 502. At step 618, the achievement score for the non-game activity is displayed to the user. FIG. 10 illustrates an exemplary user interface screen that displays an achievement score for a non-game related activity for the user.

In one embodiment, a user may also receive career progression information from the career progression service 512 in the multiplayer gaming service 502 at step 620. As discussed, the career progression information includes information about the user's accomplishments across all game activities and non-game activities that the user participates in. The technique by which career progression information may be generated by the career progression service 512 in the multiplayer gaming service 502 is discussed in detail in FIG. 6B. In step 622, the career progression information is displayed to the user. If the user does not wish to participate in a game activity at step 602 or a non-game activity at step 604, then the user is returned to a user interface on the user's processing device at step 606.

Figure 6B:
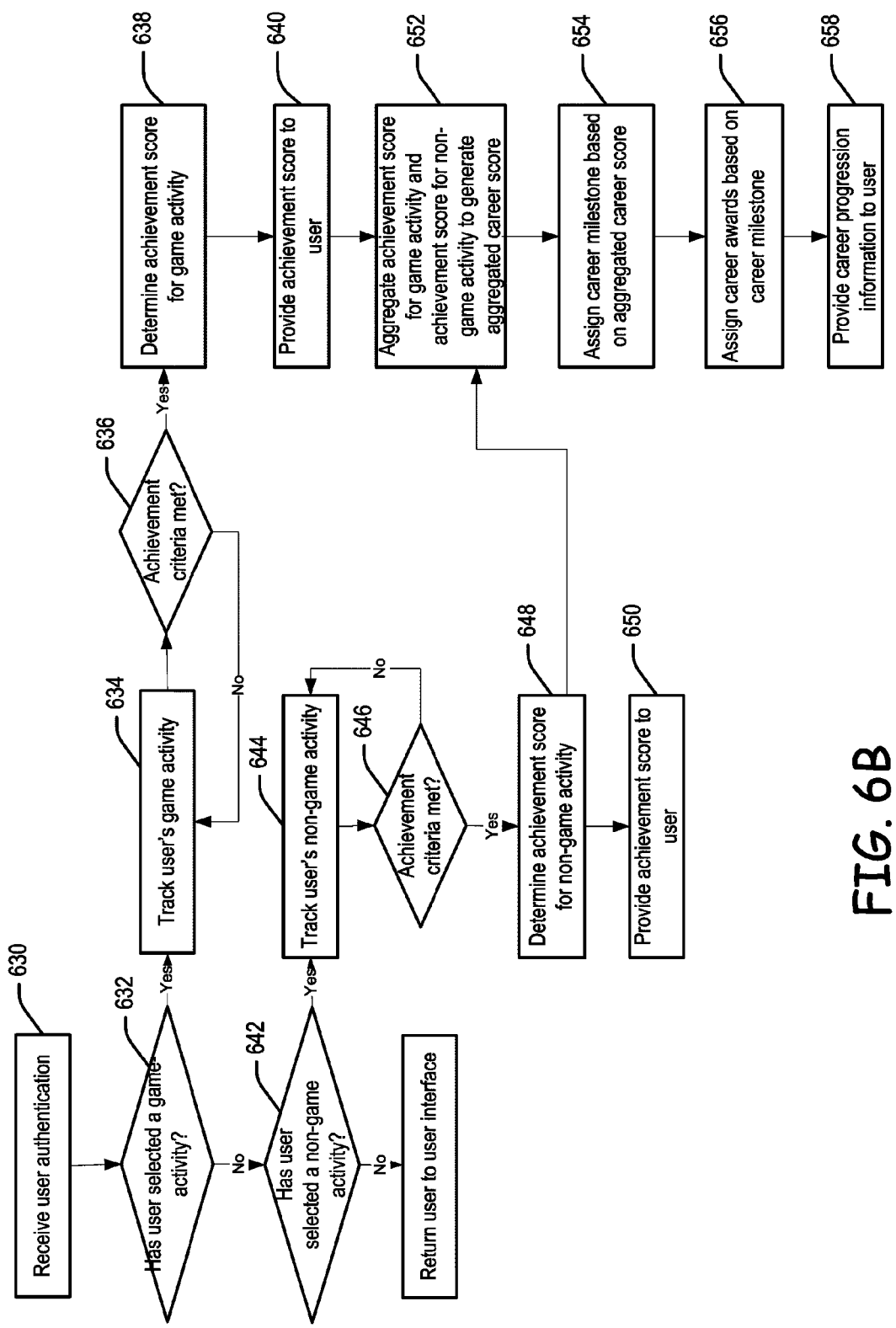
FIG. 6B illustrates an exemplary set of operations performed by a multiplayer gaming service shown in FIG. 5 to generate career progression information for a user participating in one or more activities in a processing device.

FIG. 6B illustrates an exemplary set of operations performed by the multiplayer gaming service 502 shown in FIG. 5 to generate career progression information for a user participating in one or more activities in a processing device. In one embodiment, one or more of the operations in FIG. 6B may be performed by the career progression service 512, the game activity tracking service 514, the non-game activity tracking service 516 and the user activity service 550 in the multiplayer gaming service 502. In step 630, a user's authentication is received via the user authentication service 524 in the multiplayer gaming service 502. In order to participate in an activity in the processing device, the user identity must be verified. As noted above, this may be performed at the user's processing device or at the service level. In step 632, a check is made to determine if the user selected to participate in a game activity. A user may select to participate in a game activity as discussed in step 602 in FIG. 6A and via the user interface illustrated in FIG. 7. If the user has selected to participate in a game activity, the game activity is tracked in step 634. In one embodiment, the game activity tracking service 514 in the multiplayer gaming service 502 may track the user's progress in the game activity.

At step 636, a determination is made as to whether achievement criteria related to the game activity have been met by the user. As will be appreciated, users may be awarded with game achievements based on mastering certain in-game facets of the games they play. Game achievements may be awarded to users based on multiple criteria such as, for example, a first sign-in to the game, completing a first session with a game, completing a first hour of a game, completing one hundred sessions with a game, completing ten hours with a game, completing a game, and the like. If it is determined that the user has met one or more achievement criteria, then an achievement score related to the game activity is determined in step 638. In one embodiment, an achievement score related to a game activity for a user is determined as a percentage of the total number of game-defined credit points assigned to the game activity. The total number of game-defined credit points for a particular game activity may be pre-defined by the system 502. For example, if the total number of game-defined credit points assigned to a game is 100 credit points, and the user completes a first session of the game, the user may be awarded 25% of the 100 total game-defined credit points or an achievement score of 25, in one embodiment.

In step 640, the achievement score is provided to the user's processing device. In one embodiment, the game activity tracking service 514 in the multiplayer gaming service 502 determines an achievement score related to the game activity for the user and provides the achievement score to the user's processing device. If at step 636, it is determined that achievement criteria have not yet been met, then the progress of the game activity is tracked at step 634 until one or more achievement criteria are met.

If at step 632, the user has not selected to participate in a game activity, a check is made to determine if the user has selected to participate in a non-game activity in step 642. A user may select to participate in a non-game activity as discussed in step 604 in FIG. 6A and via the user interface illustrated in FIG. 7. If the user has selected to participate in a non-game activity, the non-game activity is tracked at step 644. At step 646, a determination is made as to whether achievement criteria related to the non-game activity have been met by the user. Achievement criteria related to a non-game activity may be defined in a manner similar to the achievement criteria related to a game activity as discussed above. For example, achievement criteria for a non-game activity may be determined based on criteria such as the number of movies watched by a user or the number of books purchased by the user, in one embodiment.

If it is determined that the user has met one or more achievement criteria, then an achievement score related to the non-game activity is determined in step 648. In step 650, the achievement score is provided to the user's processing device. In one embodiment, the non-game activity tracking service 516 in the multiplayer gaming service 502 determines an achievement score related to the non-game activity for the user and provides the achievement score to the user's processing device. If at step 646, it is determined that achievement criteria have not yet been met, then the progress of the non-game activity is tracked at step 644 until one or more achievement criteria are met.

In accordance with the disclosed technology, the achievement score for the game activity (determined at step 638) and the achievement score for the non game activity (determined at step 648) may be utilized to generate an aggregated career score for the user at step 652. In one embodiment, the aggregated career score is a numeric value representing an aggregation of the achievement scores across one or more of the game activities and the non-game activities related to the user. In step 654, a career milestone is assigned to the user, based on the aggregated career score. In one embodiment, a career milestone represents a numeric achievement level of a user's progress across one or more of the game activities and the non-game activities based on the aggregated career score. For example, a user may unlock a certain career milestone when the user reaches a certain numeric value of the aggregated career score.

In step 656, a career award may be provided to the user, based on the career milestone. In one embodiment, a career award is a title provided to the user that is representative of the user's accomplishments in a specific game or non-game activity. A career award may be presented to a user, when the user accomplishes a specific group of career milestones related to a game activity or a non-game activity.

For example, a user may be awarded with a "vehicle specialist" award when the user completes a group of career milestones related to a game or non-game activity related to vehicles. A career award tier may be associated with a career award, in one embodiment. For example, a user may earn a first tier of a career award by completing a specific number of career milestones. It is to be appreciated that a career award tier may not necessarily be associated with all types of career awards and all career awards may necessarily not include the same number of career award tiers. In step 658, career progression information is generated for the user and provided to the user on the user's processing device. In one embodiment, the career progression information may include, for example, the achievement scores related to game activities and non-game activities, the aggregated career score, the career milestones and the career awards associated with the user. FIG. 10 is a user interface screen that displays career progression information for a user.

In an alternate embodiment, one or more groups of users in processing devices 500A-X may wish to participate in activities, such as game activities and non-game activities with each other. Group career progression information, including group game achievement scores, group non-game achievement scores, group aggregated career scores, group career milestones and group career awards may be generated for one or more groups of users in a manner similar to the disclosed technique of generating career progression information for individual users' participating in one or more activities in processing devices 500A-X, as discussed above.

FIG. 7 illustrates an exemplary user interface screen for enabling a user to perform one or more operations of the disclosed technology. Interface elements 702, 704 and 706 are user selectable buttons in a user interface 700 which may be selected by a user highlighting one of the visual elements 702-706 responsive to positioning instructions received from the controller 104. The "Game Activity" option 702 enables a user to select a game activity. The "Non-Game Activity" option 704 enables a user to select a non-game activity. The "Career Progression Information" option 706 enables a user to view career progression information across all game activities and non-game activities related to the user.

FIG. 8 is a user interface screen that displays exemplary game activities for a user. As discussed above, game activities may include, for example, one or more game applications stored in the multiplayer gaming service 502 that may be provided to users on processing devices 500A-X. FIG. 9 is user interface screen that displays exemplary non-game activities for a user. As illustrated, non-game activities may include, for example, online transactions 554, news and events 558, movies 560 and group interaction activities 562 that may be provided to users on processing devices 500A-X.

FIG. 10 is a user interface screen that displays career progression information associated with a user. The career progression information may include information about a user's accomplishments across all game activities and non-game activities that the user participates in. As illustrated, in one embodiment, the career progression information may include, for example, one or more game related achievement scores 900, 902, a non-game achievement score 904, an aggregated career score chart 906 and a career milestone and career award 910 for a user. In the illustrated example, a non-game achievement score of 150 for a user is determined based on, for example, the number of movies watched by the user and the number of books purchased by the user, in one embodiment. The aggregated career score chart 906 illustrates the user's aggregated career score over a period of time. The career milestone and the career award 910 indicate that a user, "Schapstick" has achieved a career milestone of 40 and has been awarded with a career title of "Sergeant", in one embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A computer implemented method for generating career progression information for a user participating in one or more activities in a processing device, the method comprising:

providing one or more activities for a user in a processing device, wherein the activities comprise at least one of both one or more game activities and one or more non-game activities;

tracking user progress in one or more of the game activities and the non-game activities;

determining one or more achievement scores for the user based on the one or more game activities and the one or more non-game activities;

aggregating the one or more achievement scores across one or more of the game activities and one or more of the non-game activities to generate an aggregated career score for the user; and generating career progression information for the user, based on the aggregated career score.

2. The method of claim 1 comprising assigning a career milestone for the user based on the aggregated career score, wherein the career milestone is representative of a numeric achievement level of user progress across one or more of the game activities and one or more of the non-game activities.

3. The method of claim 2 comprising providing a career award for the user based on the career milestone, wherein the career award is representative of user accomplishment of a specific group of career milestones related to a specific subject shared by one or more of the game activities and one or more of the non-game activities.

4. The method of claim 3 wherein the career award is associated with a career tier, and wherein the career tier is representative of user accomplishment of a specific number of career milestones related to one or more of the game activities and the non-game activities.

5. The method of claim 1 wherein the career progression information includes at least one of the one or more achievement scores, the aggregated career score, a career milestone and a career award associated with a user participating in one or more of the game activities and the non-game activities.

6. The method of claim 1 comprising generating group career progression information for one or more users in one or more processing devices.

7. The method of claim 1 wherein the game activities comprise one or more game applications.

8. The method of claim 1 wherein the non-game activities comprise at least one of online transaction activities, book activities, news and event activities, movie activities and group interaction activities.

9. The method of claim 1 comprising displaying the career progression information via a user interface in the processing device to the user.

10. The method of claim 1 comprising displaying the game activities and the non-game activities via a user interface in the processing device to the user.

11. A system for providing career progression information for a plurality of users comprising:
a multiplayer gaming service in communication with a plurality of processing devices, wherein the multiplayer gaming service comprises a:
 a user activity service for providing a plurality of users in the plurality of processing devices with one or more activities, wherein the activities include one or more game activities and one or more non-game activities;
 a game activity tracking service for tracking user progress in one or more of the game activities;
 a non-game activity tracking service for tracking user progress in one or more of the non-game activities;
 a career progression service, wherein the career progression service interacts with at least one or more of the user activity service, the game activity tracking service and the non-game activity tracking service to generate an aggregated career score for the plurality of users based on one or more of the game activities and one or more of the non-game activities; and
 the career progression service, wherein the career progression service interacts with at least one or more of the user activity service, the game activity tracking service and the non-game activity tracking service to generate career progression information for the plurality of users participating in one or more of the activities in the plurality of processing devices based on the aggregated career score for the plurality of users.

12. The system of claim 11 wherein the game activity tracking service determines an achievement score related to one or more of the game activities for the plurality of users.

13. The system of claim 11 wherein the non-game activity tracking service determines an achievement score related to one or more of the non- game activities for the plurality of users.

14. The system of claim 11 wherein the aggregated career score is generated based on aggregating one or more achievement scores across one or more of the game activities and across one or more of the non-game activities for the plurality of users.

15. The system of claim 14 wherein the career progression service assigns a career milestone for the plurality of users based on the aggregated career score.

16. The system of claim 15 wherein the career progression service provides a career award for the plurality of users based on the career milestone.

17. The system of claim 16 wherein the career progression service generates the career progression information for the plurality of users based on at least one of the achievement scores, the aggregated career score, the career milestone and the career award.

18. The system of claim 11 wherein the game activities comprise one or more game applications and wherein the non-game activities comprise at least one of online transaction activities, book activities, news and event activities, movie activities and group interaction activities.

19. A computer readable medium comprising instructions for directing a processor to perform a method comprising:
receiving a selection of one or more activities by a user on a processing device, wherein the activities comprise one or more game activities and one or more non-game activities;
tracking user progress in one or more of the game activities and in one or more of the non-game activities to determine one or more achievement scores for the user;
aggregating the one or more achievement scores across one or more of the game activities and across one or more of the non-game activities to generate an aggregated career score for the user; and
providing career progression information for the user based on at least one or more of the achievement scores, the aggregated career score, a career milestone and a career award related to the user.

* * * * *